(12) United States Patent
Miranda et al.

(10) Patent No.: US 10,495,061 B2
(45) Date of Patent: Dec. 3, 2019

(54) CONTROL METHOD FOR A WIND TURBINE

(71) Applicant: VESTAS WIND SYSTEMS A/S, Aarhus N (DK)

(72) Inventors: Erik Carl Lehnskov Miranda, Randers SV (DK); Martin Atzler, Aarhus N (DK); Shuang Li, Aarhus N (DK); Thomas Scheel, Aarhus N (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 406 days.

(21) Appl. No.: 15/125,497

(22) PCT Filed: Feb. 23, 2015

(86) PCT No.: PCT/DK2015/050036
§ 371 (c)(1),
(2) Date: Sep. 12, 2016

(87) PCT Pub. No.: WO2015/135549
PCT Pub. Date: Sep. 17, 2015

(65) Prior Publication Data
US 2017/0074245 A1    Mar. 16, 2017

(30) Foreign Application Priority Data
Mar. 12, 2014  (DK) .................................. 2014 70121

(51) Int. Cl.
*F03D 7/02*       (2006.01)
(52) U.S. Cl.
CPC .......... *F03D 7/028* (2013.01); *F03D 7/0224* (2013.01); *F05B 2270/32* (2013.01); *F05B 2270/3201* (2013.01); *Y02E 10/723* (2013.01)

(58) Field of Classification Search
CPC .......... F03D 7/028; F03D 7/0224; F03D 7/04; F03D 7/042; F03D 7/048; F05B 2270/32; F05B 2270/3201; Y02E 10/723
(Continued)

(56) References Cited

U.S. PATENT DOCUMENTS

2007/0216166 A1* 9/2007 Schubert ............... F03D 7/0224
                                                           290/55
2010/0038909 A1    2/2010 Andersen et al.
(Continued)

FOREIGN PATENT DOCUMENTS

EP       1672778 A2     6/2006
EP       2230637 A1     9/2010
WO    2012163359 A1    12/2012

OTHER PUBLICATIONS

International Search Report for PCT/DK2015/050036, dated Jun. 22, 2015.
Danish Search Report for PA 2014 70121, dated Oct. 22, 2014.

*Primary Examiner* — Richard A Edgar
*Assistant Examiner* — Brian O Peters
(74) *Attorney, Agent, or Firm* — Patterson + Sheridan, LLP

(57) ABSTRACT

The invention relates to a method of controlling a wind turbine, the wind turbine comprising wind turbine blades attached to a rotor hub and a control system for pitching the blades relative to the rotor hub. The method comprises determining a wind speed and providing a normal pitch mode of operation to control the output power of the wind turbine, where the pitch mode of operation comprises pitch reference values in dependence of the wind speed. The output power of the turbine is controlled according to the normal pitch mode of operation as a function of the wind speed if the wind speed is lower than a first upper level wind speed threshold, and according to a modified mode of
(Continued)

operation if the wind speed exceeds the first upper level threshold wind speed, wherein the modified mode of operation comprises decreasing the output power according to a de-rating function which is a function of time. The invention further relates to a control system for controlling a wind turbine according to the above mentioned control method.

17 Claims, 5 Drawing Sheets

(58) Field of Classification Search
USPC .............................................. 416/31, 36, 38
See application file for complete search history.

(56) References Cited

U.S. PATENT DOCUMENTS

| | | |
|---|---|---|
| 2010/0040468 A1 | 2/2010 | Andersen et al. |
| 2010/0045041 A1 | 2/2010 | Andersen |
| 2011/0049885 A1* | 3/2011 | Hernandez Mascarell ................ F03D 7/0224 290/44 |
| 2011/0084485 A1* | 4/2011 | Miranda ............... F03D 7/0224 290/44 |
| 2013/0161955 A1* | 6/2013 | Dalsgaard ............ F03D 7/0224 290/44 |

* cited by examiner

CONTROL METHOD FOR A WIND TURBINE

FIELD OF THE INVENTION

The present invention relates to a method of controlling a wind turbine, the wind turbine comprising wind turbine blades attached to a rotor hub and a control system for pitching the blades relative to the hub with the aim of controlling the wind turbine safely at increased wind speeds. The invention furthermore relates to a control system for performing the control method and a wind turbine comprising such control system.

BACKGROUND

Most modern wind turbines are controlled and regulated continuously with the purpose of ensuring maximum power extraction from the wind under the current wind and weather conditions, while at the same time ensuring that the loads on the different components of the wind turbine are at any time kept within acceptable limits.

In order to avoid excessive loads or undesirable wear on the wind turbine components, most modern wind turbines are controlled such as to be shut down if the wind speed exceeds some predetermined value often called the stop wind or cut-off wind.

The stopping process may simply be to stop the wind turbine e.g. by pitching the blades to their feathering position, or by adjusting some other active aerodynamic devices for changing the aerodynamic surfaces of the blades such as flaps, adjusting the power, and/or adjusting the rotational speed of the rotor.

However, in a wind power plant where a number of wind turbines are shutting down at high wind speeds in order to protect themselves may lead to sudden and significant drops in the power production, which may cause severe problems for the grid. Also, shutting down and restarting of wind turbines at high wind speeds in general can produce significant wear on the turbine components.

As an alternative to shutting down at wind speeds above a certain stop wind, it is possible to de-rate the power of the wind turbines as a function of wind speed so that the power is reduced for increasing wind speeds. Such a method of operation is described in EP 0847496 where both the power and the rotational speed of the wind turbine are decreased continuously with increasing wind speeds. However, such methods may in some situations and especially in turbulent and extreme wind conditions yield a very fluctuating de-rating of the wind turbines and may therefore be insufficient and in some cases even inadequate to protect the turbines.

SUMMARY OF THE INVENTION

It is an object of embodiments of the present invention to provide a control method for a wind turbine which obviate or reduce some of the above mentioned problems in known controlling methods.

It is a further object of the invention to provide a control strategy for a wind turbine increasing the annual energy production (AEP) of the wind turbine while controlling or reducing the fatigue loading or wear on the turbine at high wind loads.

Moreover, it is an object to establish solutions with reduced sensitivity to fluctuating wind speeds.

In accordance with the invention this is provided a method of controlling a wind turbine comprising wind turbine blades attached to a rotor hub and a control system for pitching the blades relative to the rotor hub. The method comprises determining a wind speed and providing a normal pitch mode of operation to control the output power of the wind turbine, which normal pitch mode of operation comprises pitch reference values in dependence of the wind speed. The method further comprises controlling the output power of the turbine according to the normal pitch mode of operation as a function of the wind speed if the wind speed is lower than a first upper level wind speed threshold, and controlling the output power of the turbine according to a modified mode of operation if the wind speed exceeds the first upper level threshold wind speed, wherein the modified mode of operation comprises decreasing the output power according to a pre-defined de-rating function which is a function of time and independent of the wind speed.

Hereby is obtained a simple yet effective control method avoiding the wind turbine being simply shut down at some defined stop wind speed.

Furthermore is obtained a simple and effective control method for increasing the performance such as the annual energy production (AEP), not only of an individual wind turbine, but of an entire wind farm comprising a number of wind turbines, as a reduced power production can be maintained even at high wind speeds above the standard cut-off wind speed because of the modified mode of operation of de-rating over time. This is obtained while at the same time preventing excessively high loads on the turbine components. Also, the wind turbine is better protected as de-rating generally results in reduced wear on components than the shutting down and restarting at high wind according to conventional methods.

Further, the control method yields a robust method where the de-rating rates may be relatively slow and the power production more insensitive to fluctuations in the wind speed, because of the de-rating function applied in the modified mode of operation being a function of the time and independent of the wind speed.

These advantages above are even more pronounced for a wind power plant, also referred to as a wind turbine park or farm, where several or all of the individual turbines are controlled according to the invention.

The control method may be implemented on new or existing wind turbines as pure software implementation with no need for any additional hardware on the turbine or may be implemented as a combination of software and hardware.

The de-rating function may express the output power as a linear function or a non-linear function of time, such as a step-wise linear, polynomial, or exponential function of time. The de-rating may continue for a certain pre-set amount in time or may continue for as long a time as certain other criteria are fulfilled, such as for as long the rotational speed is above a certain threshold, or until the power is below a certain value, or as long the wind speed is above a threshold value which may be equal to or different from the first upper level threshold wind speed, or combinations hereof.

By using a de-rating function which is independent of the wind speed, the control method becomes insensitive to fluctuating or fast changing wind speeds, which may otherwise be a problem with conventional control methods. Furthermore is obtained a more robust and simpler control method in that the power production is de-rated according to the same de-rating function as a function of time when the first upper level wind speed threshold is exceeded regardless of the specific wind speed value, and regardless of whether the wind speed is increasing or decreasing.

The first upper level threshold wind speed may in one embodiment be equal to or comparable to the normally applied stop wind speed of the turbine, and may lie in the region of 20-35 m/s, such as in the interval of 25-30 m/s.

The normal pitch mode of operation to control the output power of the wind turbine may for example comprise a conventional power curve of increasing power for lower wind speeds and a more or less constant maximum nominal power production at higher wind speeds.

In an embodiment of the invention, the modified mode of operation further comprises increasing the output power according to an up-rating function as a function of time if the wind speed drops below a first lower level wind speed threshold, the first lower level wind speed threshold being smaller than the first upper level wind speed threshold. In this way the power production is again increased if the wind conditions have improved and it is no longer necessary to take the same precautionary measures to protect the wind turbine. Also, the instantaneous power production is at all times and wind speeds kept as large as possible to increase the total power production. At the same time is guaranteed a gradual and continuous change in the power production even at fluctuating wind speeds or turbulent wind conditions.

In an embodiment one or more further upper level wind speed thresholds are defined where the output power is controlled to resume the decrease according to the pre-defined de-rating function if the wind speed exceeds a further upper level wind speed threshold, each further upper level wind speed threshold being larger than a preceding level upper level wind speed threshold.

Moreover, one or more further lower level wind speed thresholds may be defined where the output power is controlled to increase according to the predefined up-rating function if the wind speed drops below a further lower level wind speed threshold, each further lower level wind speed threshold being smaller than a corresponding level upper of the level wind speed threshold.

In an embodiment the one or more further upper level and lower level wind speed thresholds are pre-defined. Such multiple upper level wind speed thresholds may be defined at increasing wind speeds within the range of for example 25-35 m/s, such as in the range of 28-32 m/s. In this embodiment if a further upper level wind speed threshold is exceeded, the output power is further decreased. In this way the output power may be de-rated for example faster and faster, or according to some pre-defined function of time (such as for example an exponential function of the time, or a step-wise function of the time, or a step-wise linear function of the time) which is re-started or re-initiated each time an upper level wind speed threshold is exceeded.

If the wind drops again below a corresponding lower level wind speed threshold (lower than the corresponding upper level wind speed threshold), the output power may be up-rated again. Hereby a hysteresis is applied to the de-rating and up-rating whereby is obtained a gradual and continuous change in the power production even at fluctuating wind speeds or turbulent wind conditions. In this way the wind speed needs to change considerably to change the power control from de-rating to up-rating or vice versa.

In an embodiment the method may further comprise resuming the normal pitch mode of operation if the wind speed is lower than the first upper level wind speed threshold and the output power is increased to reach the output power as provided by the normal pitch mode of operation. Hereby the control method enables the control to be resumed and returned to the normal pitch mode of operation in the event that the wind scenario initiating the modified mode of operation has passed over. In this way is ensured a control without any drastic or sudden changes in the output power.

In another embodiment, the normal pitch mode of operation is resumed after a predetermined period of time if the wind speed is lower than the first upper level wind speed threshold. Hereby is by simple means guaranteed that the normal pitch mode of operation is at some time resumed if the wind speed is no longer critical or too high or critical to turbine operation.

According to a further embodiment of the invention, the modified mode of operation further comprises stopping the wind turbine if the wind speed exceeds a predetermined stop wind speed or if the output power reaches a predetermined minimum power threshold.

By shutting down the turbines at wind speed exceeding a predetermined stop wind speed such as e.g. 35 m/s, the safety of the wind turbine is guaranteed.

In an embodiment the control method may further specify a minimum power threshold, $P_{min}$, for example equal to 1200 kW, or other appropriate power level, below which the turbine is stopped irrespective of the wind speed. Hereby is obtained a realistic gearbox protection level to avoid torque reversals.

In an embodiment of the invention the modified mode of operation further comprises maintaining a constant output power if the output power reaches a predetermined lower power threshold. Hereby the wind turbine can be maintained operational at a safe level of power production, and the turbine needs not be de-rated to a complete stop.

According to an embodiment of the invention the modified mode of operation further comprises controlling the rotational speed of the wind turbine in addition to controlling the output power. Hereby is ensured acceptable low turbine loads. The control of the rotational speed may be performed as a function of time, as a function of the current wind speed, or combinations thereof. The control of the rotational speed may like the power be a function of time and independent of the wind speed. In this way is obtained a gradual and relatively slow change in the rotational speed which is not fluctuating even for fluctuating wind speed conditions.

In an embodiment of the invention the modified mode of operation further comprises decreasing or increasing the rotational speed of the wind turbine in accordance with the lower and upper level wind speed thresholds.

In such embodiments, the modified mode of operation may further comprise increasing the rotational speed according to an up-rating function as a function of time if the wind speed drops below the first lower level wind speed threshold, and where the normal pitch mode of operation is resumed if the wind speed is lower than the first upper level wind speed threshold.

Likewise, may the decrease of the rotational speed be resumed to the predefined de-rating function if the wind speed exceeds the further upper level wind speed thresholds. Also, the rotational speed may be increased according to the up-rating function if the wind speed drops below the further lower level wind speed thresholds.

The de-rating function and up-rating function for the rotational speed may be similar as these functions relating to the power, but adapted to control the rotational speed instead of the power.

In an embodiment the de-rating function and/or up-rating function comprises decreasing the power at a constant rate such as a rate close to 0.0003 which roughly corresponds to a rate of 1 kW/s for a 3 MW turbine, such as in the range between 0.5 kW/s to 1.5 kW/s, or other appropriate range depending on the specifications of the turbine in question. Hereby is obtained a relatively slow change of the wind turbine operation yielding a robust and reliable control method at high wind speeds.

According to an embodiment of the invention, the wind speed is measured locally on the wind turbine. This enables the control method to be performed locally on each of the wind turbines with no need for communication to e.g. a measuring station. This is further advantageous in that the wind turbine then is controlled according to the actual wind conditions at the site of the turbine.

In an embodiment of the invention, the de-rating function comprises successive time intervals of continuously decreasing the output power and of maintaining the output power approximately constant. The decreasing of the output power may in an embodiment be performed at a constant rate such as for example in the range between 0.5 kW/s to 1.5 kW/s. In this way is obtained that the output power is reduced relatively fast as soon as the de-rating function is initiated followed by a time period where the output power is reduced more slowly or even kept constant.

The invention further relates to a control system for a wind turbine configured to perform the steps of receiving a determined wind speed, providing a normal pitch mode of operation to control the output power of the wind turbine, comprising pitch reference values in dependence of the wind speed, and controlling the output power of the turbine according to the normal pitch mode of operation as a function of the wind speed if the wind speed is lower than a first upper level wind speed threshold. Further the control system is configured to perform the step of controlling the output power of the turbine according to a modified mode of operation if the wind speed exceeds the first upper level threshold wind speed, wherein the modified mode of operation comprises decreasing the output power according to a de-rating function as a function of the time.

The invention also relates to a wind turbine comprising such control system according to the above.

The advantages hereof are as described above in relation to the method of controlling a wind turbine.

BRIEF DESCRIPTION OF THE DRAWINGS

In the following different embodiments of the invention will be described with reference to the drawings, wherein.

DESCRIPTION OF EMBODIMENTS

Figure 1:
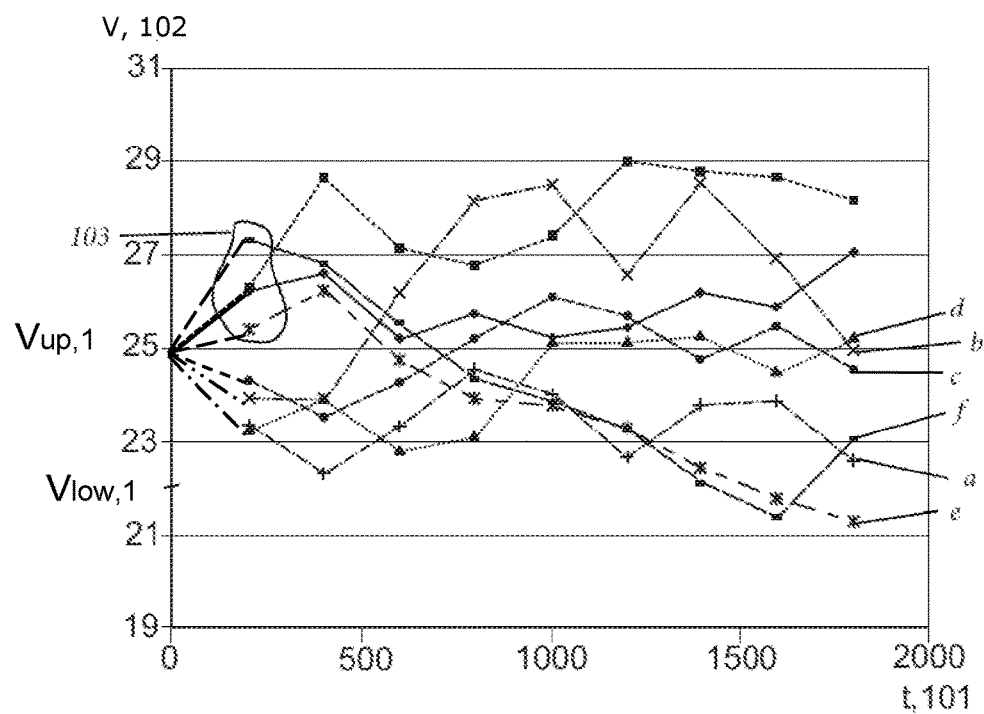
FIG. 1 shows a simulated example of the wind speed as a function of time for a number of wind turbines in a power plant.

FIG. 1 shows a simulated example of the wind speed V, 102 as a function of time t, 101 for eight different wind turbines in a wind power plant. All turbines start from a wind speed V of 25 m/s at t=0. The simulations are performed as a Monte-Carlo simulation using a statistical tool which for every 200 second assumes that the change in wind speed is a normal distribution with a mean value of 0 m/s and a standard deviation of 1 m/s. Hereby is obtained a realistic wind speed scenario for a wind power plant with wind speeds around the stop or cut-out wind which is 25 m/s for many modern turbines. The control method according to an embodiment of the invention is then applied to all the wind turbines with the first upper level wind speed threshold $V_{up,1}$ equal to the stop wind of 25 m/s.

Figure 5:
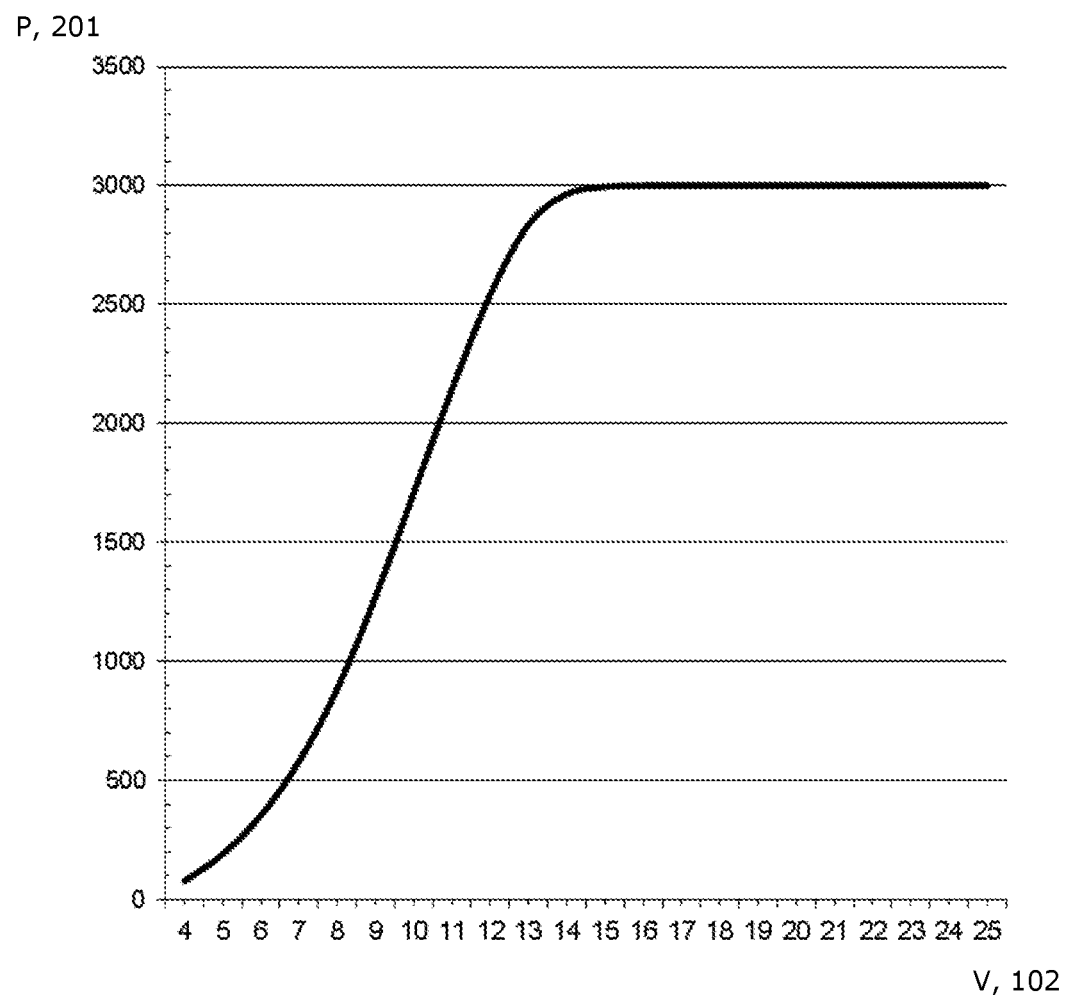
FIG. 5 shows an example of a conventional power curve during normal pitch mode of operation and with the power controlled as a function of the wind speed.

When the wind speed is lower than the first upper level wind speed threshold (here set to 25 m/s), the wind turbines are controlled according to a conventional pitch mode of operation. FIG. 5h shows an example of a conventional or normal power curve with the power P, 201 set directly as a function of the wind speed V, 102. As can be seen from the FIG. 5 the power increases with increasing wind speeds until a nominal power is reached. The nominal power in this example is 3000 kW which is reached at a nominal wind speed of 15 m/s. At wind speeds above the nominal wind speed, the turbine is controlled with a view to maintain the nominal power while reducing or controlling the loads on the turbine. During such normal mode of operation, the output power of the turbine is therefore controlled directly as a function of the wind speed by the corresponding setting of pitch reference values as a function of the wind speed.

Figure 2:
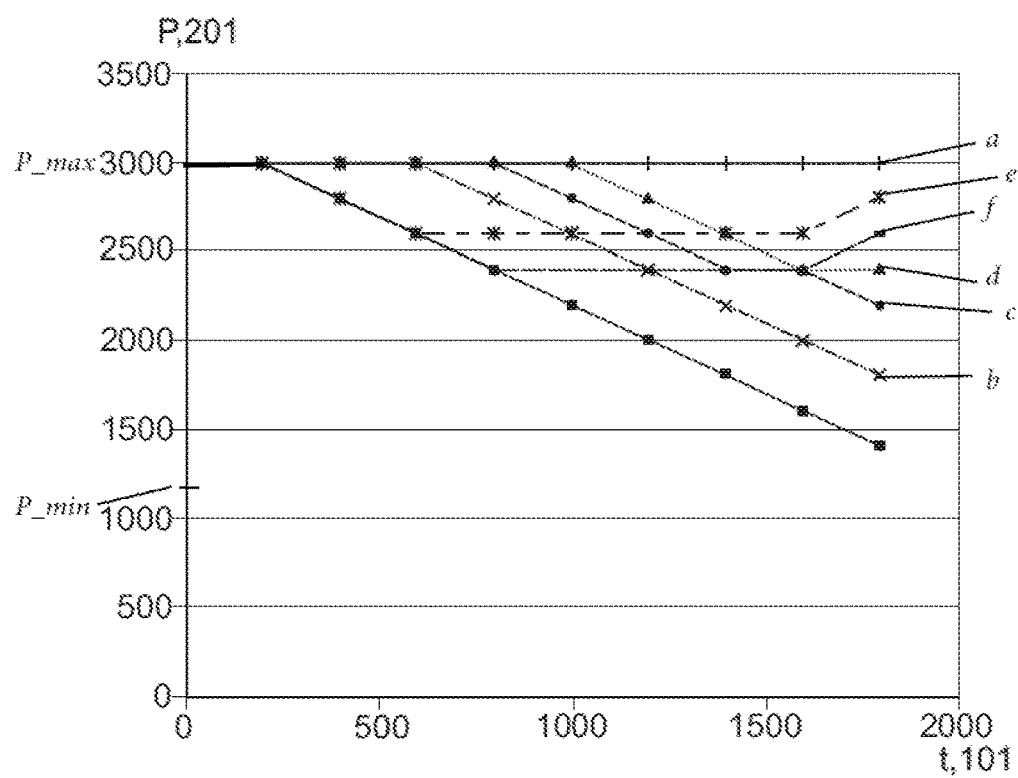
FIG. 2 shows the power produced as function of time for the wind turbines of FIG. 1 when controlled according to an embodiment of the invention.

FIG. 2 shows the power produced P, 201 by the eight turbines exposed to the wind as illustrated in FIG. 1 and when applying the control method and the parameters in the simulation as:

Start ramp down at $V_{up,1}$=25 m/s
Start ramp up at $V_{low,1}$=22 m/s
Max Power: $P_{max}$=3000 kW
Power ramp or de-rating rate: 1 kW/s.

As can be seen from the FIGS. 1 and 2, the wind turbine a (marked with '+') at no time experiences a wind speed above the 25 m/s as the first upper level wind speed threshold $V_{up,1}$ and therefore continues unaffected with the normal pitch mode of operation which here is maximal power of $P_{max}$=3000 kW. As long as the wind speed is above $V_{up,1}$=25 m/s the turbines de-rates with the power ramp in this example of 1 kW/s. This can be seen to happen to four of the turbines already at the first time step, encircled 103, whereas the turbines b and c (marked with crosses and filled circles, respectively) only start de-rating later and the turbine d (marked with triangles) even later at the time t=1000. As soon as the wind speed drops below $V_{low,1}$=22 m/s the turbines start up-rating again until the normal power for the current wind speed according to the normal pitch mode of operation is reached. Such up-rating only happens for two of the turbines e and f near the end of the simulation.

If a conventional stopping control had been applied to the eight turbines exposed to the winds of FIG. 1, four of the turbines would have shut down completely after the first time step as the wind speed then is above 25 m/s.

In an embodiment the control method may further specify a minimum power, $P_{min}$, for example equal to 1200 kW below which the turbine is stopped irrespective of the wind speed. Hereby is obtained a realistic gearbox protection level to avoid torque reversals. This minimum power was not reached in the simulations shown in FIGS. 1 and 2.

Figure 4:
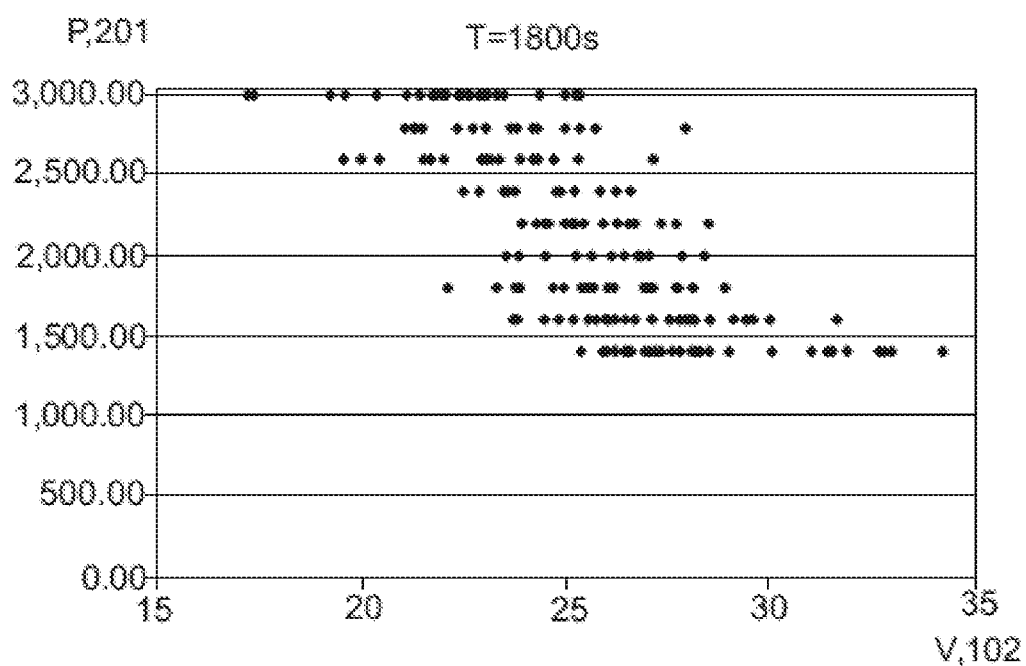
FIG. 4 illustrates the resulting power as a function of the wind speed resulting from Monte-Carlo simulations of 200 wind turbines controlled according to an embodiment of the invention a time span of 1800 s and at wind speeds around a first upper level threshold wind speed of 25 m/s.

FIG. 4 shows the power P,201 versus wind speed V,102 resulting from similar Monte-Carlo simulations as described above except that 200 turbines have been simulated and for time spans of ½ hour at wind speeds around 25 m/s. Each dot in the figure then marks the current power and wind speed for a wind turbine at the time T of 1800 s in FIG. 4.

It appears that the produced power generally decays with the wind speed with some scatter. The situations with high wind and high power which cause high turbine loading can be seen to be avoided with the proposed control method. For safety reasons it can be considered to shut down the turbines at e.g. 35 m/s. As can be seen from FIG. 4, all turbines have a full or reduced power production illustrating that annual energy production can be reasonably expected to be considerably improved as less power is lost when the turbines are de-rated rather than stopped at high wind loads.

Figure 3:
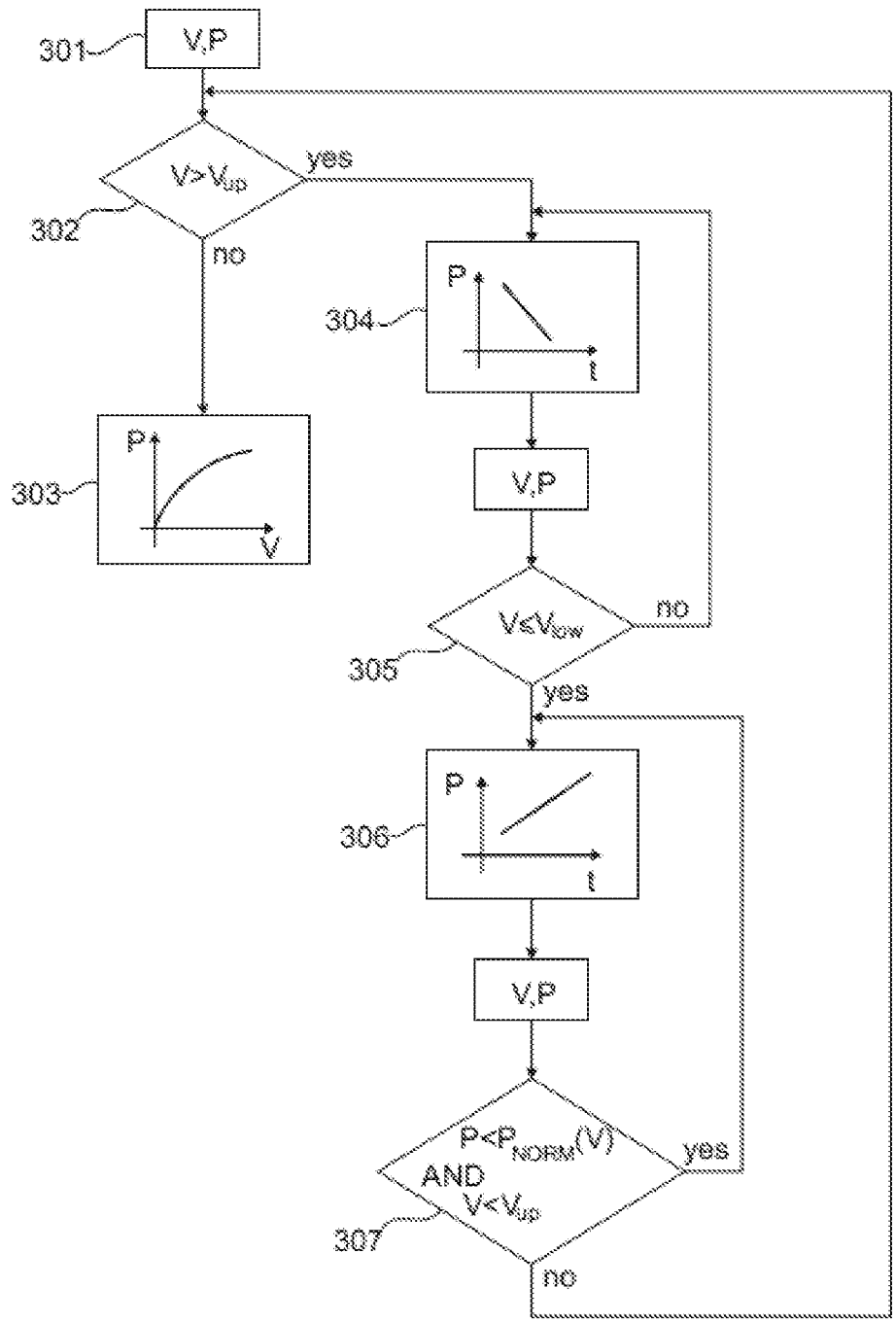
FIG. 3 is a flow chart illustrating a control method according to an embodiment of the invention.

FIG. 3 is a flow chart illustrating different steps in a control method according to an embodiment of the invention. If a measured wind speed V, 301, is below a first upper level wind speed threshold $V_{up,1}$ (step 302) the normal pitch mode of operation is followed as illustrated in 303 with the sketched standard power curve. If the first upper level wind speed threshold $V_{up,1}$ is exceeded, a modified mode of operation of de-rating the power as a function of the time is followed as illustrated in 304. Applying the modified mode of operation of de-rating, the power is set to decrease with time independently of the current wind speed.

This is continued until the wind speed drops below a first lower level wind speed threshold, $V < V_{low,1}$ (step 305), in which case the power is again up-rated, 306. The power is increased until normal power for that wind speed is reached (step 307) and of course as long at the wind speed continues to be lower than the first upper level threshold value. When the normal power is reached again, the normal pitch mode of operation is resumed.

In an embodiment, the modified mode of operation further includes maintaining the power constant when the wind speed drops below the first upper level wind speed threshold and until the first lower level wind speed threshold is reached (in which case the power is again up-rated) or until the wind speed exceeds the upper level first wind speed threshold (in which case the de-rating as a function of time is resumed).

The flow chart of FIG. 3, only illustrates the process for the first upper and lower level wind speed thresholds. However, the process may be expanded to include also further levels of upper and lower level wind speed thresholds.

Figure 6:
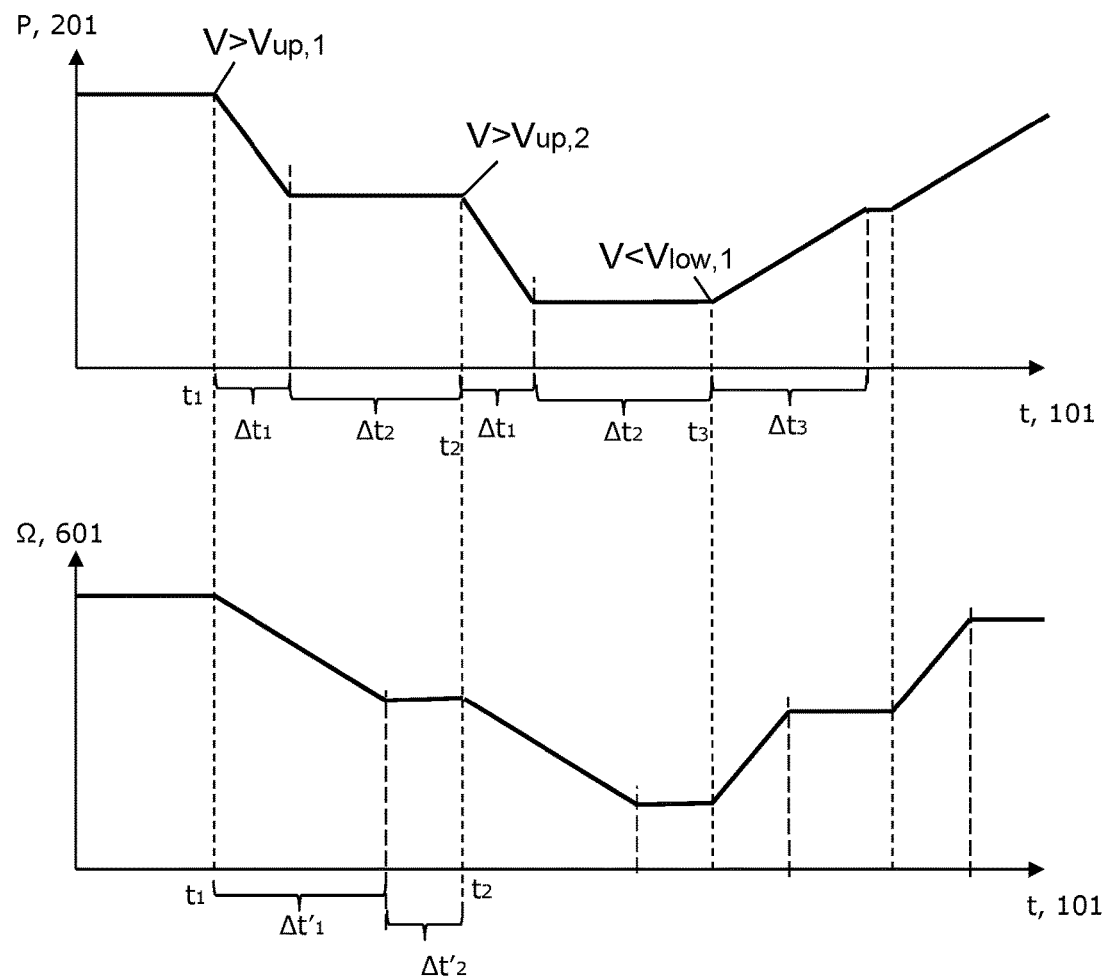
FIG. 6 shows an embodiment of the invention of the de-rating of the output power and rotational speed of the wind turbine as a function of time.

In FIG. 6 the curves show a de-rating of the output power P, 201 and of the rotational speed Ω, 601 as a function of the time t, 101 according to one embodiment of the invention. Initially both the output power and the rotational speed are at their nominal values. At the time $t_1$ the wind speed exceeds the pre-set first upper level wind speed threshold, $V > V_{up,1}$ and a modified mode of operation is initiated. In this embodiment both the output power P, 201 and the rotational speed Ω, 601 are decreased as a function of the time t, 101. The de-rating of the power P, 201 is performed by decreasing the output power at a constant rate for a first period of time or time interval $\Delta t_1$ followed by keeping the output power constant for a second time interval $\Delta t_e$. Thus the de-rating function comprises a decreasing part (in time span $\Delta t_1$) and a constant part (in time span $\Delta t_2$). This procedure is then repeated at $t_2$ where the wind speed exceeds the second upper level wind speed threshold, $V > V_{up,2}$. At time $t_3$ the wind speed drop below a lower level wind speed threshold, $V < V_{low,1}$. Then the critical wind effect is considered to be over and the output power is up-rated again. The up-rating may likewise be performed as sketched in FIG. 6 by successive time intervals of increasing the power and of maintaining a constant or approximately constant output power.

The rotational speed Ω, 601 is in this embodiment de-rated correspondingly to the output power as outlined in the lowermost curve in FIG. 6. However, the time intervals $\Delta t'_1$ and $\Delta t'_2$ during which the rotational speed is decreased linearly at a constant rate or maintained at a constant level need not be the same as the time intervals $\Delta t_1$ and $\Delta t_2$ governing the corresponding de-rating function of the output power.

The output power may advantageously be reduced faster than the rotational speed to avoid high torque situations. This effect is obtained when the output power is reduced less than 10% faster than the rotational speed, such as for example in the range of 1-3% faster. Similarly the rotational speed may be increased faster than the output power to avoid high torque situations during up-rating, such as 1-10% faster than the power or 1-3% faster.

While preferred embodiments of the invention have been described, it should be understood that the invention is not so limited and modifications may be made without departing from the invention. The scope of the invention is defined by the appended claims, and all devices that come within the meaning of the claims, either literally or by equivalence, are intended to be embraced therein.

What is claimed is:

1. A method of controlling a wind turbine, the wind turbine comprising blades attached to a rotor hub and a control system for pitching the blades relative to the rotor hub, the method comprising:
   determining a wind speed;
   controlling, when the wind speed is less than a first upper level wind speed threshold, an output power of the wind turbine according to a normal pitch mode of operation, wherein in the normal pitch mode the control system generates pitch reference values dependent on the wind speed; and
   controlling the output power of the wind turbine according to a modified mode of operation, wherein in the modified mode of operation:
      when the wind speed exceeds the first upper level wind speed threshold, the output power is decreased according to a predefined, time-based de-rating function that is independent of the wind speed; and
      when the wind speed exceeds a second upper level wind speed threshold that is greater than the first upper level wind speed threshold, the output power is further decreased according to the predefined, time-based de-rating function.

2. The method of controlling a wind turbine according to claim 1, wherein in the modified mode of operation, the output power is increased according to a time-based up-rating function when the wind speed drops below a first lower level wind speed threshold that is less than the first upper level wind speed threshold.

3. The method of controlling a wind turbine according to claim 2, wherein the normal pitch mode of operation is resumed when the wind speed is lower than the first upper level wind speed threshold and the output power is increased to reach the output power as provided by the normal pitch mode of operation.

4. The method of controlling a wind turbine according to claim 1, wherein, in the modified mode of operation, the wind turbine is stopped when at least one of: the wind speed exceeds a predetermined stop wind speed, and the output power reaches a predetermined minimum power threshold.

5. The method of controlling a wind turbine according to claim 2 wherein the method further comprises increasing the output power according to the up-rating function as a result of the wind speed dropping below a second lower level wind speed threshold that is less than a corresponding upper level wind speed threshold.

6. The method of controlling a wind turbine according to claim 2, wherein the de-rating function comprises a decreasing part and a constant part and wherein the up-rating function comprises an increasing part and a constant part.

7. The method of controlling a wind turbine according to claim 2, wherein the modified mode of operation further comprises controlling a rotational speed of the wind turbine in addition to controlling the output power.

8. The method of controlling a wind turbine according to claim 7, wherein, in the modified mode of operation, the rotational speed of the wind turbine is increased or decreased in accordance with the lower and upper level wind speed thresholds.

9. The method of controlling a wind turbine according to claim 7, wherein at least one of: the output power is controlled to decrease at a greater rate than a rate of decreasing the rotational speed, and the rotational speed is controlled to increase at a greater rate than a rate of increasing the output power.

10. The method of controlling a wind turbine according to claim 2, wherein at least one of: the de-rating function and the up-rating function, comprises controlling the output power at a constant rate.

11. The method of controlling a wind turbine according to claim 10, wherein the constant rate output power is within the range of 0.5 kW/s to 1.5 kW/s.

12. A control system for a wind turbine configured to perform:
receiving a determined wind speed;
controlling, when the wind speed is less than a first upper level wind speed threshold, an output power of the wind turbine according to a normal pitch mode of operation, wherein in the normal pitch mode the control system generates pitch reference values dependent on the wind speed; and
controlling, when the wind speed exceeds the first upper level wind speed threshold, the output power and rotational speed of the wind turbine according to a modified mode of operation wherein in the modified mode of operation:
the output power is decreased according to a pre-defined, time-based de-rating function that is independent of the wind speed, and
wherein at least one of: the output power is controlled to decrease at a greater rate than a rate of decreasing the rotational speed, and the rotational speed is controlled to increase at a greater rate than a rate of increasing the output power.

13. The control system according to claim 12, wherein the greater rate of decreasing the output power is 10% or less than the rate of decreasing the rotational speed.

14. The control system according to claim 12, wherein in the modified mode of operation, the output power is increased according to a time-based up-rating function when the wind speed is below a first lower level wind speed threshold that is less than the first upper level wind speed threshold.

15. A method of controlling a wind turbine comprising:
determining a wind speed;
controlling, when the wind speed is less than a first upper level wind speed threshold, an output power of the wind turbine according to a normal pitch mode of operation, wherein in the normal pitch mode a control system of the wind turbine generates pitch reference values dependent on the wind speed; and
controlling, when the wind speed exceeds the first upper level wind speed threshold, the output power of the wind turbine according to a modified mode of operation, wherein the output power is decreased according to a predefined, time-based, de-rating function that is independent of the wind speed, and the de-rating function comprises a decreasing part and a constant part.

16. The method according to claim 15, wherein, the modified mode of operation, the output power is increased according to a time-based up-rating function when the wind speed drops below a first lower level wind speed threshold that is less than the first upper level wind speed threshold.

17. The method according to claim 16, wherein the up-rating function comprises an increasing part and a constant part.

* * * * *